(12) United States Patent
Tischer et al.

(10) Patent No.: US 7,249,200 B2
(45) Date of Patent: Jul. 24, 2007

(54) PROCESS, COMMUNICATION DEVICE AND COMMUNICATION MODULE FOR DETERMINING COMMUNICATION IDENTIFIERS

(75) Inventors: Mirko Tischer, Vaihingen/Enz (DE); Holger Heinemann, Leinfelden (DE); Jurgen Kluser, Pfullingen (DE)

(73) Assignee: Vector Informatik GmbH, Stuttgart (DE)

( * ) Notice: Subject to any disclaimer, the term of this patent is extended or adjusted under 35 U.S.C. 154(b) by 847 days.

(21) Appl. No.: 10/391,615

(22) Filed: Mar. 20, 2003

(65) Prior Publication Data
US 2003/0182407 A1    Sep. 25, 2003

(30) Foreign Application Priority Data
Mar. 20, 2002    (EP)    ................... 02400016

(51) Int. Cl.
*G06F 15/16*    (2006.01)
(52) U.S. Cl. ....................................... 709/253
(58) Field of Classification Search ................ 709/253, 709/227
See application file for complete search history.

(56) References Cited

U.S. PATENT DOCUMENTS

| 4,638,313 | A |   | 1/1987  | Sherwood, Jr. et al. |
| 4,730,251 | A |   | 3/1988  | Aakre et al. |
| 6,216,172 | B1 | * | 4/2001  | Kolblin et al. ............... 709/253 |
| 6,484,221 | B1 | * | 11/2002 | Lorinser et al. ............ 710/200 |

* cited by examiner

*Primary Examiner*—Rupal Dharia
*Assistant Examiner*—Chirag R. Patel
(74) *Attorney, Agent, or Firm*—Browdy and Neimark, PLLC

(57) ABSTRACT

The present invention is concerned with a process for determining communication identifiers for communication devices connected over a network, which have start identifiers assigned to them, as well as with a communication device and a communication module therefor. Each communication device performs the following steps synchronized with the respective other communication devices: (a) determine a first own decision value on the basis of the start identifier (SI1-SI3) that is assigned to the communication device (K1-K4) in each case, (b) send the own decision value over the network (NET), (c) compare the own decision value to the received decision values, and (d) claim at least one communication identifier and transmit this at least one communication identifier over the network, if no received decision value is available in step (c), or if it was determined in step (c) that only one decision value was received and that the respective own decision value is of a higher order than that of said received decision value.

18 Claims, 5 Drawing Sheets

Figure 1:
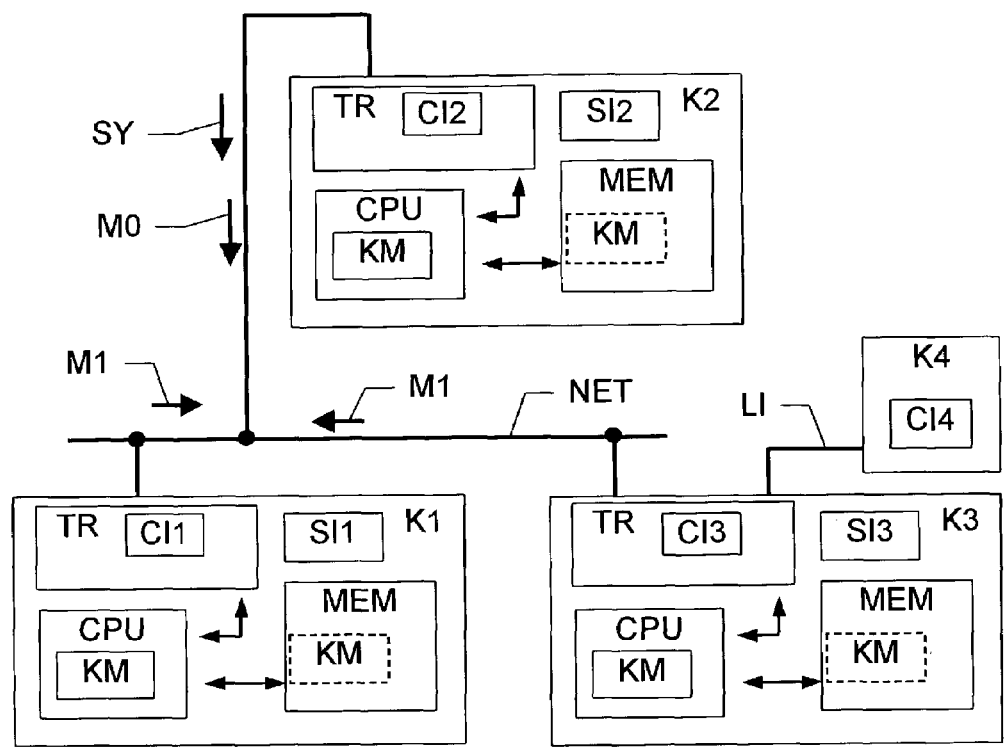

|    | SI         | SEC32 - SEC4 | SEC3 | SEC2 | SEC1 |
|----|------------|--------------|------|------|------|
| K1 | 0x12345671 |              | V0   | V0   | V1   |
| K2 | 0x12345672 |              | V0   | V1   | V0   |
| K3 | 0x12345673 |              | V0   | V1   | V1   |

|    | SI         | SEC16 - SEC3 | SEC2 | SEC1 |
|----|------------|--------------|------|------|
| K1 | 0x12345671 |              | V0   | V1   |
| K2 | 0x12345672 |              | V0   | V2   |
| K3 | 0x12345673 |              | V0   | V3   |

PROCESS, COMMUNICATION DEVICE AND COMMUNICATION MODULE FOR DETERMINING COMMUNICATION IDENTIFIERS

The present invention is concerned with a process for determining communication identifiers for communication devices that are connected over a network, as well as with a communication device and communication module therefor.

To communicate over a network, e.g., over a bus, the communication devices that are connected to one another over the network, e.g., bus participants, must reciprocally identify themselves to each other by means of communication identifiers. A communication identifier serves, e.g., as a source and/or destination address for messages that are transmitted on the network. Each communication device on the network has one or more communication identifier(s) uniquely assigned to it, i.e., any communication identifier is designated in the network for only one single communication device.

For dynamically adaptable networks it is nearly impossible to assign individual unique communication identifiers to the communication devices already during their production, as the address space for communication identifiers is generally limited. A CAN identifier (CAN=Controller Area Network), for instance, has 11 or 29 bits.

The communication identifiers may be assigned to the communication devices for example by a system administrator or system integrator. With CAN systems, it is also customary for the communication identifiers, in case of the CAN bus the so-called CAN identifiers, to be assigned to the communication devices by a kind of compiler. The compiler analyses, for example, possible future communication relationships between the communication devices and selects the communication identifiers accordingly. However, that solution is suitable specifically for a fixed network configuration. A dynamic modification of the network, for example by connecting additional communication devices, is virtually impossible.

It is, therefore, the object of the present invention to permit a dynamic determination of communication identifiers.

This object is met with a process for determining communication identifiers for communication devices connected over a network, which have start identifiers assigned to them, wherein, according to the process, each communication device performs the following steps synchronized with the respective other communication devices:
(a) Determine a first own decision value on the basis of the start identifier that is assigned to the communication device in each case,
(b) Send the own decision value over the network,
(c) Compare the own decision value to the received decision values, and
(d) Claim at least one communication identifier and transmit this at least one communication identifier over the network if no received decision value is available in step (c), or if it was determined in step (c) that only one decision value was received and that the respective own decision value is of a higher order than that of said received decision value.

The object is additionally also met with a communication device and a communication module according to the teachings of additional independent claims.

It is an underlying concept of the invention that the communication devices apply for the right, so to speak, to claim at least one communication identifier. Within the framework of an elimination process, which in an advantageous variant of the invention may incorporate a plurality of elimination cycles, the communication devices form decision values from their respective start identifiers and send the decision values to the other communication devices that are connected to the network. Each communication device then compares its own decision value to the received decision value or decision values. If the decision value of one communication device is of a higher order than all the other decision values, this communication device has acquired the right to claim at least one communication identifier. This communication device accordingly claims one or more communication identifiers and informs the other communication devices of this communication identifier or these communication identifiers.

A decision value "2" may be of a "higher order" within the meaning of the invention than, for example, a decision value "1", or vice versa. A decision value "2A" may be of a lower order compared to a decision value "1B", or vice versa.

The inventive process permits a flexible and efficient assignment of communication identifiers to communication devices.

Additional advantages of the invention will become apparent from the dependent claims, as well as from the specification.

The utilized network is advantageously a bus system, in particular a Controller Area Network bus system (CAN bus system).

The process is advantageously repeated until each of the communication devices has claimed at least one communication identifier. A communication device that already has at least one communication identifier assigned-to it preferably does not participate in the repeat cycles. The number of repeat cycles advantageously correlates with the number of communication devices participating in the inventive process.

The communication devices advantageously determine their respective decision values according to a predefined rule on the basis of their respective assigned start identifiers. It is possible, in principle, for the respective decision value to be formed by the respective start identifier or a portion of the same. It is preferable, in any case, that the start identifiers are different from one another. This has the effect that when the same rule is applied by each of the communication devices, different decision values are formed. However, in principle it would also be possible to generate the decision values by determining different decision values from the start identifiers in such a way that a random number is combined with a start identifier or formed on the basis of the start identifier.

If, within the framework of an elimination cycle, the highest-order transmitted decision value was transmitted by two or more communication devices, a winner, so to speak, in the competition for the right to claim a communication identifier cannot yet be determined. These two or more communication devices then go through a further elimination cycle, during which they determine a new decision value in each case on the basis of their respective start identifier, and transmit the same over the network. In other words, the communication devices repeat the steps (b) and (c) of the inventive process at least once within the framework of a step (e) on the basis of an additional own decision value that is advantageously different from the previous decision value, if they have determined in step (c) that the respective own decision value is equal to at least one received decision value and that no decision value that was received is of a higher order than their own decision value.

A communication device is preferably eliminated from the process and does not repeat steps (b) and (c) if it determines during step (c) that its own current decision value is of a lower order than at least one received decision value.

A particularly preferred variant of the invention provides for the respective first decision value to be determined on the basis of a first segment of the respective start identifier and the respective at least one second decision value to be determined on the basis of at least one second segment of the respective start identifier. The segments are preferably formed from neighboring sections of the respective start identifier.

For example, a number of $i_m$ communication devices is connected to the network. For each communication device, a start identifier with a number of $n_{id}$ bits is provided. Each start identifier can be divided into $m_s$ segments. The number of bits per segment may encompass a range of 1 through $n_{id}$. The segments are preferably of identical size, with each segment then having a length of $k_{msg}$ bits. The correlation between the start identifier and number of segments can then be expressed as follows:

$$n_{id} = m_s * k_{msg} \quad (1)$$

The number of possible different decision values preferably correlates to the number of possible different segments, as well as to the length of a given segment. The decision values can be determined from the segments based on a computing rule. It is preferred, however, that the decision values correspond to the values of the segments and preferably are whole numbers.

A message is advantageously provided in each case for the individual transmission of each possible transmission value. The number $j_{msg}$ of messages required for this is:

$$j_{msg} = 2^{k_{msg}} \quad (2)$$

For the decision values that can be determined from the segments, which are preferably the value of the given segment itself, a predetermined message, particularly a CAN message, is advantageously provided in each case.

The inventive method is preferably performed in predetermined time intervals. For example, steps (a), (b) and (c), or (b), (c), and (e) are performed during one interval. In each case, a communication device preferably sends only one own decision value during each interval.

An elimination process preferably incorporates a predefined number of elimination cycles. The number of intervals of an elimination cycle preferably correlates with the number of segments that are formed from the respective start identifiers. A predetermined maximum duration may be predefined for each elimination cycle.

With a segmentation of the start identifier in the above manner and a duration Z of an interval, wherein the duration of the interval for sending a decision value is preferably the same as the duration of an interval for claiming a communication identifier, this results in the following duration based on the above formulas (1) and (2):

$$D_{max} = (m_s + 1) * i_m * Z \quad (3)$$

until each of the communication devices has claimed one or more communication identifiers.

The communication devices advantageously perform the inventive process after the predefined completion of a start-up phase. It is true that it is possible for the communication devices to have a synchronous, contemporaneous start-up behavior, for example after a common voltage supply is switched on, for example if they have identical system components, e.g., memory and processors. Especially with different start-up behaviors of the communication devices, which is often the case in practice, it is preferred, however that each communication device informs the respective other communication devices of the completion of its start-up phase by means of a synchronization message. The synchronous start of the inventive process is then attained, for example, in such a way that the communication devices wait a predefined waiting period after completion of their start-up phases before performing step (a), and that they start the waiting time again when a synchronization message is received. When the last communication device on the network has reached its ready mode, the waiting time is allowed to pass one last time by all communication devices prior to starting the inventive process.

However, in principle, other methods may also be applied for the start-up synchronization of the communication devices.

Figure 2:
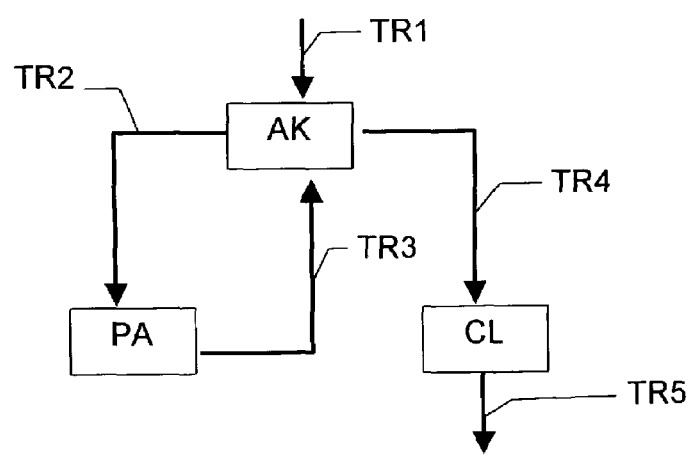
Figures 3, 4B:
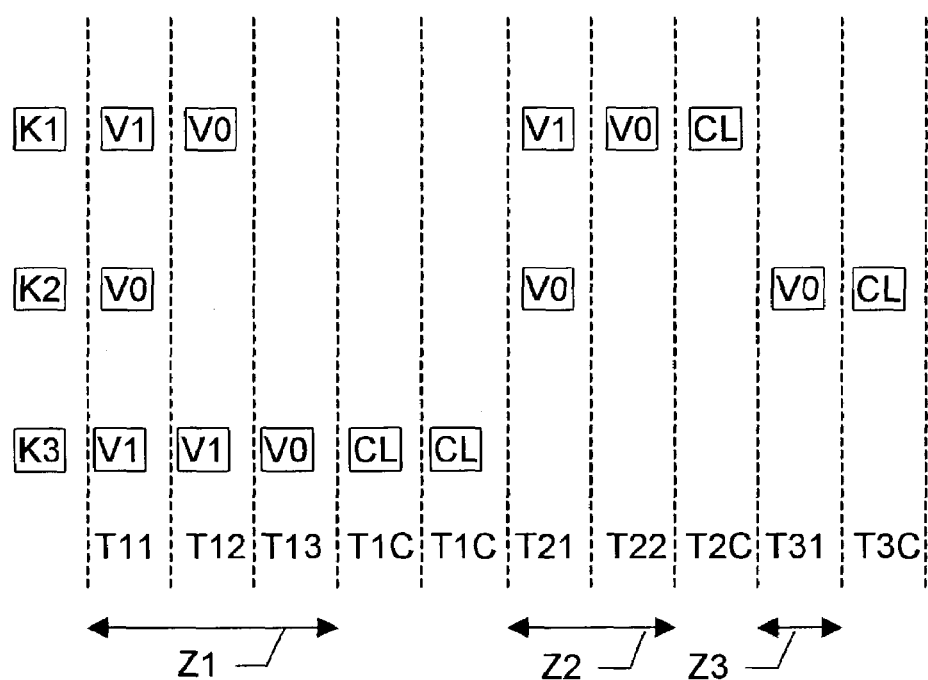
Figure 4A:
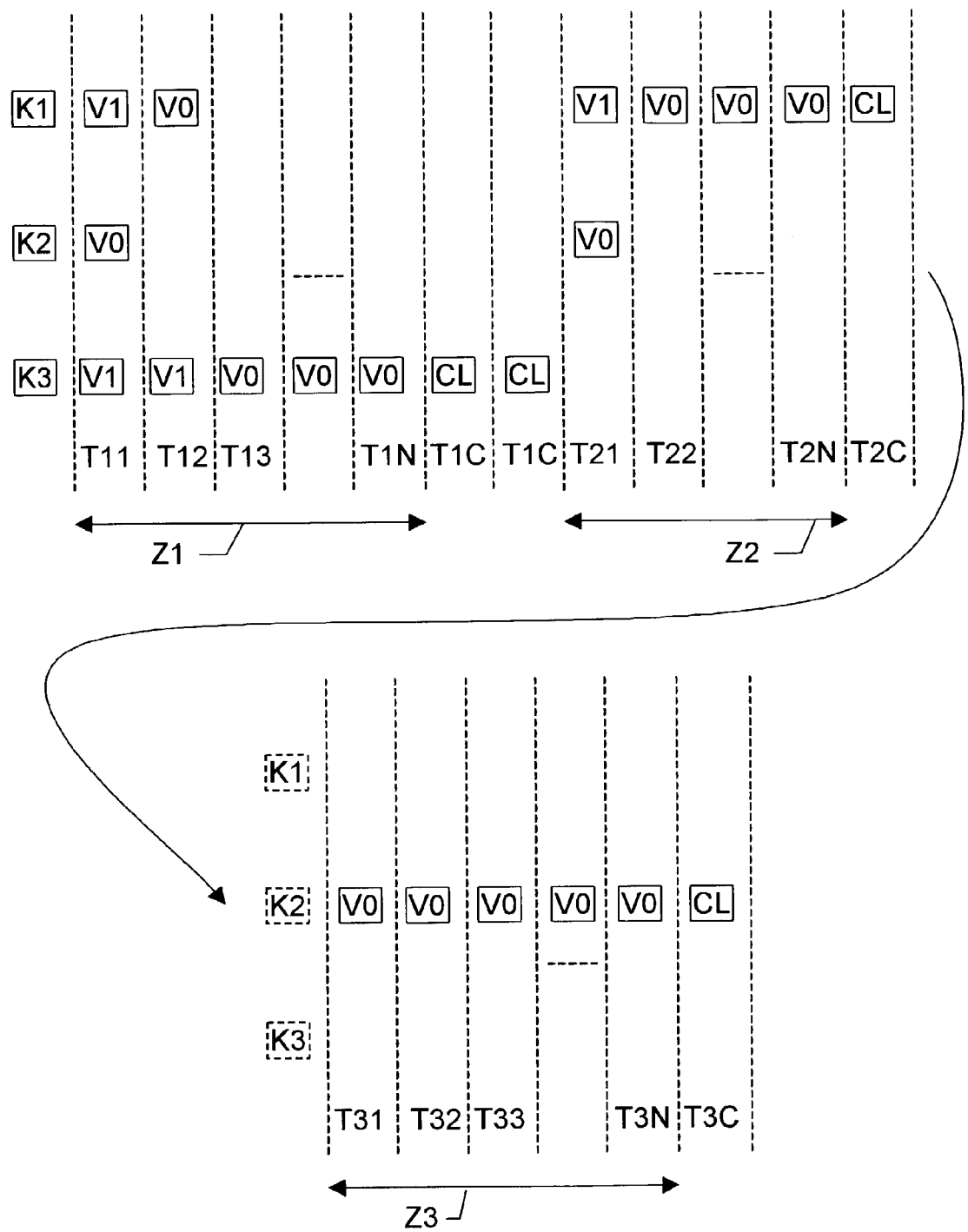
Figures 5, 6:
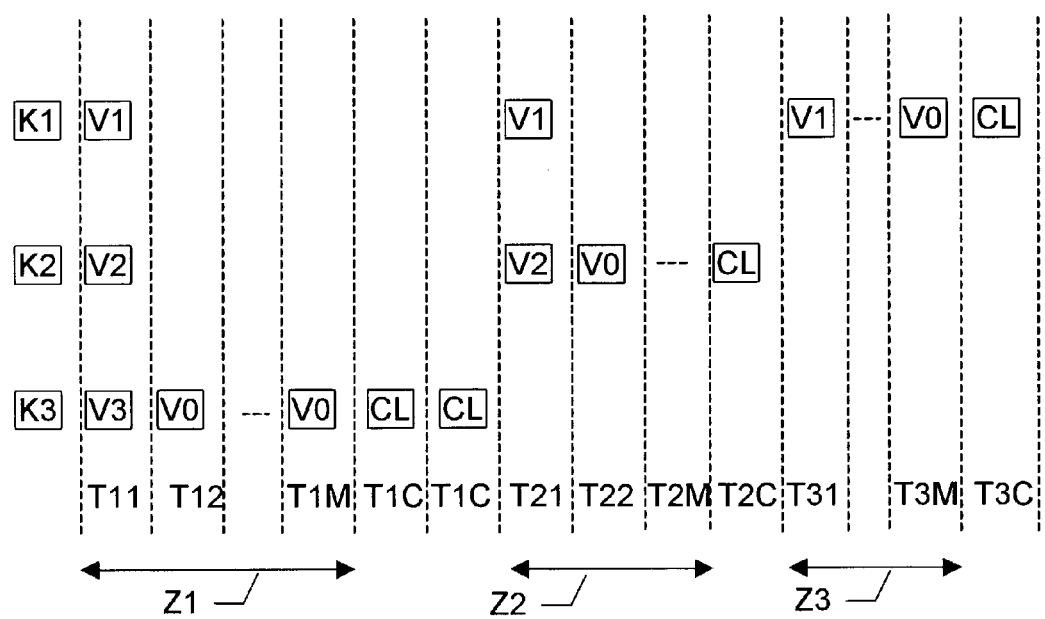
Figure 7:
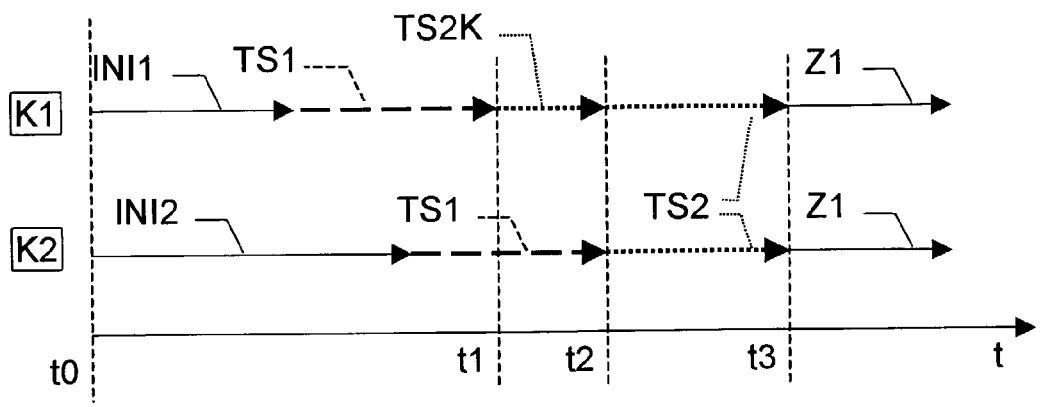
Figure 8:
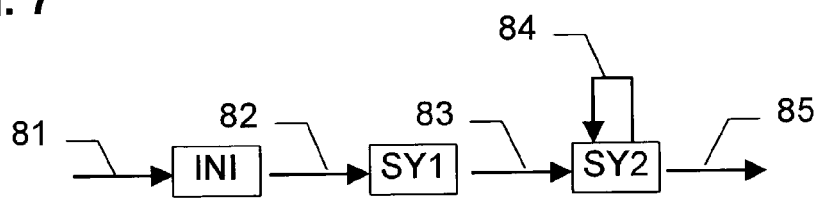
Figure 9:
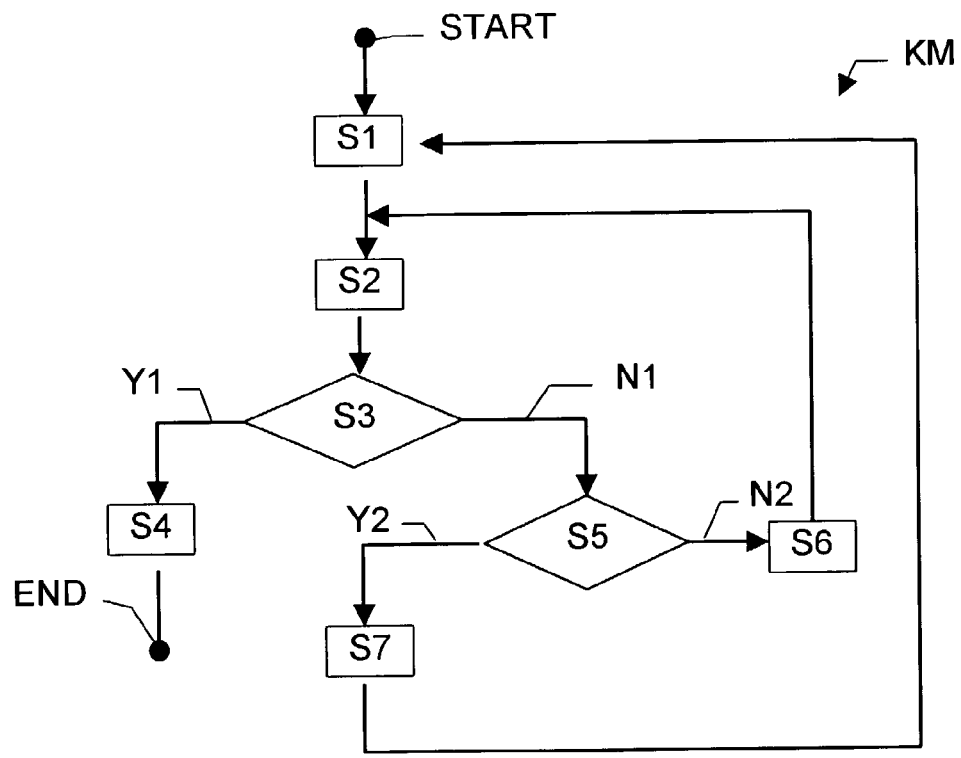

The invention will be explained in more detail below based on a sample embodiment with reference to the drawing, in which:

FIG. 1 shows three inventive communication devices that are connected over a network, each of which contains an inventive communication module, FIG. 2 shows a state transition diagram of a communication module according to FIG. 1, FIG. 3 shows a table to illustrate a determination of decision values on the basis of start identifiers that are assigned to the communication devices according to FIG. 1, FIG. 4A shows a schematically illustrated time progression of the inventive method on the basis of the decision values according to FIG. 3, FIG. 4B shows a variant of the sequence according to FIG. 4A, FIG. 5 shows a determination, as an alternative to FIG. 3, of decision values on the basis of start identifiers, FIG. 6 shows a schematically illustrated time progression of the inventive method on the basis of the decision values in FIG. 5, FIG. 7 shows a time diagram of a synchronized start-up of two communication devices according to FIG. 1, FIG. 8 shows a state transition diagram of one of the communication devices according to FIG. 1 during a synchronized start-up according to FIG. 7, and FIG. 9 shows a schematic flow diagram illustrating a mode of operation of a communication module according to FIG. 1.

FIG. 1 shows communication devices K1, K2, K3 and K4 that are connected over a network NET, which may be, for example, actuators and sensors of a control system, e.g., in an automobile or locking system, or the like. The communication device K4 is connected to the network NET only indirectly, namely via the communication device K3. The network NET may, for example, be a bus, in particular a CAN bus. The communication devices K1, K2 and K3 have start identifiers SI1, SI2 and SI3 assigned to them, which, in the present case, are different from one another. The start identifiers SI1, SI2 and SI3 may be the serial numbers of the communication devices K1-K3, for example.

The communication devices K1, K2, and K3, which may also be referred to as Electronic Control Units (ECU), are shown only schematically in FIG. 1. They incorporate control means CPU, memory means MEM and connection means TR. The connection means TR may be, for example, a CAN bus driver module or other interface module. The control means CPU is a processor, for example, whereby program code can be executed that is stored in the memory means MEM. The control means CPU executes, for example, the program code of an inventive communication module KM, which can be loaded by the control means CPU from the memory means MEM. The memory means MEM may be, for example, hard drives, RAM modules (RAM=Random Access Memory), or so-called Flash-ROM modules (ROM=Read Only Memory). With the aid of the connection means TR, the communication devices K1-K3 are able to send and receive messages, e.g., CAN messages, over the network NET.

For the reciprocal addressing of messages of this type, the communication devices K1, K2, K3, K4 require communication identifiers CI1, CI2, CI3 and CI4, which, however, are not yet available at the respective system start of the communication devices K1-K3. Below, it will be described how the communication devices K1-K3 determine the communication identifiers CI1, CI2, CI3 and CI4 after a joint system start.

The individual system starts of the communication devices K1-K3 may have different durations, for example because the control means CPU of the communication device K1 are less efficient than the control means CPU of the communication device K2. Before the communication devices K1-K3 cooperatively determine the communication identifiers CI1, CI2, CI3, and CI4, they must all be operational. The communication devices K1-K3 therefore first reciprocally determine a defined completion of their start-up phases; they synchronize their start-up.

An example of a synchronized startup will be explained for the communication devices K1 and K2 with the aid of FIG. 7. The start-up synchronization of the communication device K3 with the communication devices K1 and K2 takes place accordingly; however it will be explained below only in part.

For example, when a voltage supply for the network NET is switched on, or after a network-wide or local reset command, or the like, the communication devices K1 and K2, at a time t0, start a first initialization phase INI1, INI2, during which, for example, the memory means MEM are initialized, the communication module KM is loaded into the control means CPU, or the like. This process is shown in general for each of the communication devices K1-K3 in the form of a start transition 81 into an initialization phase INI in FIG. 8.

At the end of the initialization phases INI1, INI2, the communication devices K1 and K2 transition into a waiting phase SY1 (transition 82), during which they are already operational but do not yet react to messages they are receiving. The waiting phase SY1 lasts for a time period TS1, the duration of which may be "0". In other words, the waiting phase SY1 is not necessarily required. After the waiting phase SY1, the communication devices K1-K3 transition (transition 83) into a waiting phase SY2 with a waiting time TS2, during which they wait for synchronization messages SY.

During the transition 83, the communication devices K1-K3 send out synchronization messages SY. The communication devices K1 and K2 send the synchronization messages SY at times t1 and t2, respectively. The waiting phase SY2 is restarted in each case when a synchronization message SY is received by the communication devices K1-K3 (transition 84) to compensate for initialization phases INI of different durations.

The initialization phase INI1 of the communication device K1, for example, is shorter than the initialization phase INI2 of the communication device K2, i.e., the communication device K1 sends out the synchronization message SY at a time t1 at which the communication device K2 has not completed its initialization. While the communication device K2 is still in its waiting time TS2, the initialization phase INI2 of the communication device K2 is ultimately completed. When the communication device K1 receives the synchronization message SY sent by the communication device K2 at the time t2, the communication device K1 restarts its waiting time TS2; the waiting phase of the communication device K1 between the times t1 and t2 is thus shortened to a time period TS2K. Only after a jointly observed completion of the waiting time TS2—which may optionally restart again when a synchronization message SY is received from the communication device K3—do the communication devices K1 and K2 start the inventive process (transition 85) at a time t3.

An example for a determination of the communication identifiers CI1, CI2, CI3, and CI4 will be shown below with the aid of FIGS. 3 and 4. The communication devices K1-K3 have been assigned start identifiers SI1, SI2 and SI3 with values 0×12345671, 0×12345672, and 0×12345673, i.e., 32-bit values. The start identifiers SI1, SI2 and SI3 in the example of FIG. 3 must be evaluated in the present case by the communication devices K1-K3 in 32 segments SEC1 through SEC32 with one bit each, in such a way that the communication devices K1-K3 determine decision values V0 or V1, which, in the present example, correspond to binary "0" or "1".

In a first time interval T11 of an elimination cycle Z1, the communication devices K1, K2 and K3 determine the decision values V1, V0 and V1, respectively, that are assigned to the segment SEC1 of their start identifiers SI1, SI2, and SI3 and send the same over the network NET. Messages M0 and M1, for example, are provided for the decision values V0 and V1. The respective own decision values V1, V0 and V1. The communication device K2, in the process, determines that its own decision value V0 is of a lower order than the two received decision values V1. It is also possible that the communication device K2, for example due to a simultaneous sending by the communication devices K1 and K3, receives only a single decision value V1. It then also determines that its own decision value V0 is of a lower order than this received decision value V1. The communication device K2, in either case, drops out of the elimination cycle Z1.

The communication devices K1 and K3, on the other hand, in a second time interval T12, determine decision values V0 or V1 on the basis of a segment SEC2 of their start identifiers SI1 and SI3, respectively, and transmit these to each other. The communication device K1 then determines that its own decision value V0 is of a lower order than the received decision value V1 and drops out of the elimination cycle Z1.

The communication device K3 thus is the only communication device left remaining in the elimination cycle Z1. It may, as shown in FIG. 4A, continue to send decision values V0 and V1 for the segments SEC3 through SEC32 in time intervals T12 through T1N. Afterwards, the communication device K3 claims, in two time intervals T1C, by means of claim messages CL, one communication identifier CI3 for itself and one communication identifier CI4 for a communication device K4, which is connected to the network NET via the communication device K3. The communication device K3 transmits the communication identifiers CI3 and CI4, which may be CAN identifiers, for example, to the communication devices K1 and K2 over the network NET.

They thus "know" that the communication identifiers CI3 and CI4 have already been claimed and are, therefore, no longer available to be claimed later.

A process as shown in FIG. 4A, wherein the communication device that no longer receives decision values during a time interval of an elimination cycle and, from its point of view, has already "won" this elimination cycle, also continues to generate further decision values for all segments of its start identifier and sends them over the network NET is advantageous particularly with CAN systems where an accidental overlaying of identical messages is possible. It is possible, for example, as previously explained, for two or more communication devices to simultaneously transmit identical messages, especially messages with identical decision values, over the network. One communication device is then unable to recognize that the other communication device has sent the same message. The continued sending of decision values—and, hence, the potentially possible receipt of decision values from other communication devices—reduces the likelihood that one communication device does not detect another communication device that is competing in the elimination process.

However, the communication device K3 may also, as shown in FIG. 4B, already detect during the time interval T13 that it is no longer receiving any decision values and conclude from that that it has "won" the elimination cycle Z1. In principle, the communication device K3 could even make that determination during the time interval T12 during which it has received only one single decision value V0, which, however, was of a lower order than its own decision value V1. At any rate, the communication device K3, after it has detected that it has "won" the elimination cycle Z1, can directly claim the communication identifiers CI3, CI4.

After completing the elimination cycle Z1, the communication devices K1 and K2 start an elimination cycle Z2 in which the communication device K3, which is already provided with communication identifiers, no longer participates. During a first time interval T21, the communication devices K1 and K2 again determine the decision values V1 and V0 assigned to the segment SEC1 of their start identifiers SI1, SI2 and transmit the same over the network NET. The communication device K2 determines that its decision value V0 is of a lower order than the decision value V1 it has received and drops out of the decision cycle Z2. The communication device K1, on the other hand, continues to transmit decision values V0 or V1 in time intervals T22 through T2N (see FIG. 4A), or it determines already during time interval T22 (see FIG. 4B) that it has won the elimination cycle Z2. At any rate, the communication device K1 claims a communication identifier CI1 and transmits the same over the network NET after the elimination cycle Z2 has ended.

At the end of an elimination cycle Z3, in which now only the communication device K2 is participating, the same claims a communication identifier CI2 of its own and transmits it over the Network NET. The elimination cycle Z3 may incorporate time intervals T31 through T3N, as shown in FIG. 4A, or, for example, only the time interval T31, if the communication device K2 determines during the time interval T31 (FIG. 4B) that is not receiving any decision values, i.e., that it is the only participant in the elimination cycle Z3 and, therefore, no competitor exists in the competition for communication identifiers.

A variant of the example in FIGS. 3, 4A, 4B, is shown in FIGS. 5 and 6. The start identifiers SI1, SI2 and SI3 in this variant must be evaluated not in 32 segments SEC1 through SEC32 but in 16 segments SEC1 through SEC 16, each with a length of 2 bits, in such a way that the communication devices K1-K3 determine decision values V0, V1, V2, or V3, which correspond, for example, to the numerical values "0", "1", "2", or "3". The decision values V0, V1, V2, or V3 have messages M0-M3 assigned to them, not all of which are not shown.

Due to the lesser number, compared to the example in FIG. 3, of 16 segments SEC1 through SEC16 that are generated from the start identifiers SI1, SI2 and SI3, and the accordingly larger number of different decision values V0, V1, V2 or V3, the elimination processes Z1 through Z3 are comparatively shorter. The maximum number of time intervals per elimination cycle Z1 through Z3 correlates with the number of segments SEC1 through SEC16. The elimination processes Z1 through Z3, in the present case, each contain a maximum number of 16 time intervals T11 through T1M, T21 through T2M, and T31 through T3M.

In the time interval T11, the communication devices K1-K3 determine and send decision values V1, V2 and V3. The decision value V3 of the communication device K3 is the highest-order decision value in the time interval T11, with the result that the communication devices K1 and K2 are eliminated from the decision cycle Z1. At its end, the communication device K3 claims the communication identifiers CI3 and CI4. In the elimination cycle Z2, in which the communication device K3 does not participate, the communication device K2 "wins," since its decision value V1 is of a higher order than the decision value V2 of the communication device K1. After the elimination cycle Z2, the communication device K2 claims the communication identifier CI2. The communication device K1 is the only one left participating in the elimination process and ultimately claims the communication identifier CI1.

It goes without saying that, in principle, the start identifiers SI1, SI2 and SI3 in their entirety may, in each case, also form a basis for determining decision values. In that case the value range of the decision values corresponds to that of the start identifiers. The communication devices K1-K3 can then also determine and transmit their own respective start identifiers SI1, SI2, and SI3 as decision values. The elimination process can then be concluded in one single elimination cycle, and even in one single time interval.

A flow chart to illustrate a sample mode of operation of one of the inventive communication modules KM is shown in FIG. 9. The communication module KM, in the process, assumes the states AK, PA and CL, which are shown in a state transition diagram, a so-called "(finite) state machine" according to FIG. 2. With the aid of the communication modules KM, the communication devices K1-K3 are able to determine the communication identifiers CI1, CI2, CI3 and CI4. The communication modules KM control, for example, the access of the communication devices to their connection means TR.

In a start transition TR1, which is formed by the transition 85 according to FIG. 8, or which may be triggered by the same, the communication module KM transitions into a state AK, in which it is ready to send or transmit decision values, or "active", so to speak.

The communication module KM is assigned, for example, to the communication device K1 and acts on the basis of the variant of a segment formation shown in FIG. 3. In its state AK, the communication module KM determines, in a step S1, a first decision value V1, which it transmits, in a step S2, to the other communication devices K2 and K3. In step 2, the communication module KM of the communication device K1 additionally receives the respective decision values V0 and V1 from the communication devices K2 and K3.

In a subsequent step S3, the communication module KM verifies whether its own decision value V1 is of a higher order than all received decision values V0 and V1 (own decision value>received decision value(s)"). While the decision value V0 is of a lower order, the decision value V1 is not. The communication module KM therefore moves on to a step 5, in which it verifies whether its own decision value V1 is of a lower order than one of the received decision values V0 and V1 ("own decision value<received decision value(s)"). This is not the case, so that the communication module KM moves on to a step S6 (indicated by an arrow N2), in which it forms a second decision value V0 for the time interval T12 on the basis of the segment SEC2.

The communication module KM subsequently moves on to step S2, the sending of its own decision value V0 and receiving of the decision value V1 from the communication device K3. In step S3, the communication module KM determines that its own decision value V0 is not of a higher order than the received decision value V1 and, accordingly, moves on to step S5. There, the communication module KM determines that its own decision value V0 is of a lower order than the received decision value V1 and moves on (indicated by an arrow Y2) to a step S7, in which it waits for the start of a new elimination cycle, in the present case the elimination cycle Z2.

By means of the transition according to the arrow Y2, the communication module KM transitions into a state PA, indicated in FIG. 2 with a transition TR2. The transition TR2 means that the communication module KM has been eliminated from a current elimination cycle, overruled, so to speak by the other communication devices K2 and K3. In its state PA, the communication module KM remains passive. It does not send any further decision values. It waits until the current decision cycle has ended. The communication module KM determines the end of the elimination cycle in such a way, for example, that it receives one or more claim messages from one of the other communication devices K2 and K3, in which the same claims one or more communication identifiers. The communication module KM determines the receipt of the last claim message in such a way, for example, that an "end marker" is contained in the last message. The communication module KM may also restart a timeout counter after each claim message. After it has timed out, no further claim message is expected, the current elimination process accordingly has ended.

The communication module KM then again transitions, in a transition TR3, into its state AK, which in FIG. 9 corresponds to the transition from step S7 to step S1. In step S1, which is now assigned to the beginning of the elimination cycle Z2, the communication module KM again determines the decision value V1 of the segment SEC1 of the start identifier SI1. It sends the same in step S2 to the communication device K2. From the communication device K2, the communication module KM receives its decision value V0. In step S3 the communication module KM determines that its own decision value V1 is of a higher order than the received decision value V0 and moves on to a step S4, as indicated by an arrow Y1, in which it claims the communication identifier CI2 and sends the same over the network NET.

The transition from step S4 to the end END of the flow chart corresponds to the transition TR4 in FIG. 2 from the state AK to the state CL, which could also be called the "Communication Identifier Has Been Claimed" state. In this state CL, the communication module KM has claimed all necessary communication identifiers. It does not send out any further claim messages CL and remains passive during future elimination processes. It does, however, receive claim messages CL with communication identifiers from other communication devices. The communication module KM exits the state CL in a transition TR5, e.g., when it does not receive any messages with decision values and/or no claim messages CL for a predefined period of time. The communication devices K1-K3 have then received the communication identifiers CI1, CI2, CI3, and CI4, and the network NET is thus operational.

If a communication device is newly connected to the network NET, the above process may be reinitiated. It is also possible for the newly added communication device to query the other communication devices for their communication identifiers and/or for them to automatically transmit their communication identifiers over the network NET when they receive a message SY from the newly added communication device.

A communication device that cannot perform the inventive process may be given a communication identifier, for example from a reserved address space. The communication devices that participate in the inventive process do not claim any communication identifiers from this address space.

With a CAN bus it is necessary for a message that a communication device fulfills the function of a recipient. If all communication devices K1-K3 now want to send their decision values as simultaneously as possible without a recipient being present, this results in a collision problem. To solve this problem, one or more communication devices may function as recipients, for example the communication device K1. The first elimination process is then performed, for example, first by the communication devices K2 and K3, the second elimination process by the "loser" of the first elimination process and the communication device K1.

What is claimed is:

1. A process for determining a plurality of communication identifiers (CI1-CI4) for uniquely identifying respective ones of a plurality of communication devices (K1-K4) connected over a network (NET), each one of the plurality of communication devices having respective ones of a plurality of start identifiers (SI1-SI3) assigned to them, wherein each communication device (K1-K4) performs the following steps synchronized with the respective other communication devices (K1-K4):

(a) determine a first own decision value (V0, V1; V0-V3) on the basis of the respective start identifier (SI1-SI3) that is assigned to the communication device (K1-K4) in each case;

(b) send the own decision value (V0, V1; V0-V3) over the network (NET);

(c) compare the own decision value (V0, V1; V0-V3) to received decision values (V0, V1; V0-V3);

(d) claim at least one communication identifier of the plurality of communication identifiers (CI1-CI4) and transmit said at least one communication identifier over the network (NET), if no received decision value (V0, V1; V0-V3) is available in step (c), or if it was determined in step (c) that only one decision value (V0, V1; V0-V3) was received and that the respective own decision value (V0, V1; V0-V3) is of a higher order than that of said received decision value (V0, V1; V0-V3); and (e) determine at least one second own decision value (V0, V1; V0-V3) on the basis of the start identifier (SI1-SI3) that is assigned to the communication device (K1-K4)

in each case, and repeat the steps (b) and(c) on the basis of said at least one second own decision value (V0, V1; V0-V3) if it is determined in step (c) that the respective own decision value (V0, V1; V0-V3) is equal to at least one received decision value (V0, V1; V0-V3) and that no received decision value (V0, V1; V0-V3) is of a higher order than the own decision value (V0, V1; V0-V3).

2. A process according to claim 1, wherein steps (a)-(e)are repeated until each of the communication devices (K1-K4) has claimed at least one communication identifier (CI1-CI4).

3. A process according to claim 1 or 2, wherein the start identifiers (SI1-SI3) that are assigned to the communication devices (K1-K4) are different from one another.

4. A process according to claim 1, wherein the step of determining the respective own decision value comprises determining the respective first decision value (V0, V1; V0-V3) on the basis of a first segment (SEC1) of the respective start identifier (SI1-SI3) and step of determining the respective at least one second own decision value (V0, V1; V0-V3) comprises determining the respective at least one second own decision value (V0, V1; V0-V3) on the basis of at least one second segment (SEC2) of the respective start identifier (SI1-SI3).

5. A process according to claim 4, further comprising generating the at least one second segment (SEC1, SEC2) from neighboring segments of the respective start identifier (SI1-SI3).

6. A process according to claim 4, further comprising:
providing a predefined number of segments (SEC1, SEC2) for each start identifier (SI1-SI3); and
when a communication device (K1-K4) receives no decision value (V0, V1; V0-V3) in step (c), or receives only one single received decision value (V0, V1; V0-V3) in step (c), which is of a lower order than the respective own decision value (V0, V1; V0-V3), forming decision values based on further segments of the predefined number of segments (SEC1, SEC2) that have not been evaluated previously, and sending said decision values over the network (NET).

7. A process according to claim 1, wherein the steps (a), (b) and (c), or (b), (c) and (e) are performed within a predefined time interval (T11 T12, T1N).

8. A process according to claim 7, wherein each communication device (K1-K4) sends only one decision value (V0, V1; V0-V3) in each case within one time interval (T11, T12, T1N).

9. A process according to claim 1, wherein a communication device (K1-K4) does not repeat steps (b) and (c) and drops out of the process, if it determines in step (c) that its own current decision value (V0, V1; V0-V3) is of a lower order than at least one received decision value (V0, V1; V0-V3).

10. A process according to claim 1, wherein communication devices (K1-K4) perform the same after the predefined completion of a start-up phase.

11. A process according to claim 10, further comprising, by each communication device (K1-K4), forming the respective other communication devices (K1-K4) of the completion of its start-up phase by means of a synchronization message (SY).

12. A process according to claim 11, further comprising, by communication device (K1-K4), after completing its start-up phase, waiting a predefined waiting time before performing step (a), and restarting its waiting time when it receives a synchronizing message (SY).

13. A process according to claim 1, wherein the network (NET) comprising a bus system, in particular a Controller Area Network bus system (CAN bus system).

14. A process according to claim 1, further comprising reinitiating the process if a communication device (K1-K4) is newly connected to the network (NET).

15. A process according to claim 1, wherein at least one communication identifier (CI1-CI4) is reserved for a communication device that does not participate in the process and cannot be claimed by the communication devices (K1-K3) participating in the process.

16. A communication device for determining a plurality of communication identifiers (CI1-CI4), which is connectable over a network (NET) to at least one additional communication device (K2-K3), wherein the communication devices (K1-K3) have start identifiers (SI1-SI3) assigned to them in each case, with means for a synchronous performance of the following steps when the communication device (K1-K4) is connected to the at least one other communication device (K1-K4) over the network (NET):
(a) determine a first own decision value (V0, V1; V0-V3) on the basis of the start identifier (SI1) that is assigned to the communication device (K1) in each case;
(b) send the respective own decision value (V0, V1; V0-V3) over the network (NET);
(c) compare the respective own decision value (V0, V1; V0-V3) to received decision values (V0, V1; V0-V3);
(d) claim at least one communication identifier (CI1) and transmit this at least one communication identifier (CI1) over the network (NET), if no received decision value (V0, V1; V0-V3) is available in step (c), or if it was determined in step (c) that only one decision value (V0, V1; V0-V3) was received and that the respective own decision value (V0, V1; V0-V3) is of a higher order than that of said received decision value (V0, V1; V0-V3); and
(e) determined at least one second own decision value (V0, V1; V0-V3) on the basis of the start identifier (SI1-SI3) that is assigned to the communication device (K1-K4) in each case, and repeat the steps (b) and(c) on the basis of said at least one second own decision value (V0, V1; V0-V3) if it is determined in step (c) that the respective own decision value (V0, V1; V0-V3) is equal to at least one received decision value (V0, V1; V0-V3) and that no received decision value (V0, V1; V0-V3) is of a higher order than the own decision value (V0, V1; V0-V3).

17. A communication module stored in a memory of a communication device (K1) for determining communication identifiers (CI1-CI4), wherein the communication device (K1) is connectable over a network (NET) to at least one additional communication device (K2-K4), wherein the communication devices (K1-K4) have start identifiers (SI1-SI3) assigned to them in each case, wherein the communication module (KM) incorporates program code that is executable by a control means (CPU) of the communication device (K1), wherein the communication device (K1) can perform the following steps synchronized with the respective other communication devices (K2-K4) if it is connected to the at least one additional communication device (K1-K4) over the network (NET):
(a) determine a first own decision value (V0, V1; V0-V3) on the basis of the start identifier (SI1) that is assigned to the communication device (K1);
(b) send the respective own decision value (V0, V1; V0-V3) over the network (NET);

(c) compare the respective own decision value (V0, V1; V0-V3) to received decision values (V0, V1; V0-V3);

(d) claim at least one communication identifier (CI1-CI4) and transmit this at least one communication identifier (CI1-CI4) over the network (NET), if no received decision value (V0, V1; V0-V3) is available in step (c), or if it was determined in step (c) that only one decision value (V0, V1; V0-V3) was received and that the respective own decision value (V0, V1; V0-V3) is of a higher order than that of said received decision value (V0, V1; V0-V3); and (e) determined at least one second own decision value (V0, V1; V0-V3) on the basis of the start identifier (SI1-SI3) that is assigned to the communication device (K1-K4) in each case, and repeat the steps (b) and(c) on the basis of said at least one second own decision value (V0, V1; V0-V3) if it is determined in step (c) that the respective own decision value (V0, V1; V0-V3) is equal to at least one received decision value (V0, V1; V0-V3) and that no received decision value (V0, V1; V0-V3) is of a higher order than the own decision value (V0, V1; V0-V3).

18. Memory means, comprising a diskette or CD-ROM, Digital Versatile Disc, (DVD), hard drive, or the like, having a communication module according to claim 17 stored thereon.

* * * * *